United States Patent [19]
Gaeddert

[11] 4,258,619
[45] Mar. 31, 1981

[54] ROTARY BALER HAVING BALE-EJECTING APPARATUS

[75] Inventor: Melvin V. Gaeddert, Newton, Kans.

[73] Assignee: Hesston Corporation, Hesston, Kans.

[21] Appl. No.: 52,743

[22] Filed: Jun. 28, 1979

[51] Int. Cl.³ .......................... A01D 39/00; B30B 5/04
[52] U.S. Cl. ......................................... 100/88; 56/341
[58] Field of Search ..................... 100/88; 56/341, 343

[56] References Cited
U.S. PATENT DOCUMENTS
4,208,862  6/1980  Waldrop ..................... 100/88 X FOREIGN PATENT DOCUMENTS
1433580  4/1976  United Kingdom ..................... 100/88

Primary Examiner—Edward L. Roberts
Attorney, Agent, or Firm—Schmidt, Johnson, Hovey & Williams

[57] ABSTRACT

A rotary baler utilizing endless, driven belts to assist in formation of the bale has a tailgate that is raised for discharge of the bale after the forming cycle has been completed. A span of the belting is carried by the tailgate as the latter is opened, and a stationary tightener is positioned in the path of travel of the span during its movement with the tailgate so that the belting is progressively deflected in a transverse direction by the tightener as the tailgate continues to open, thereby tensioning the belting to forcefully eject the bale from the baler.

5 Claims, 6 Drawing Figures

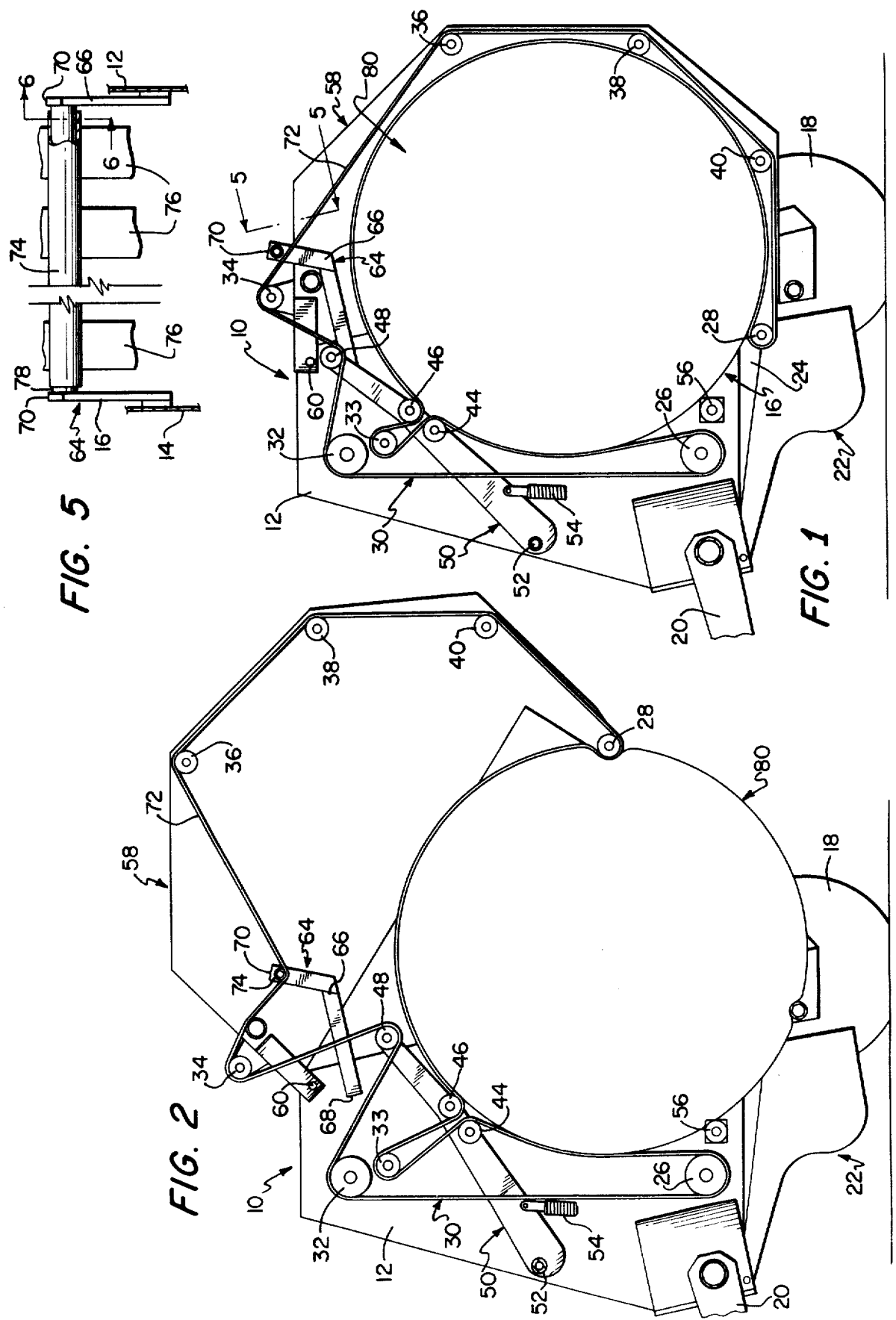

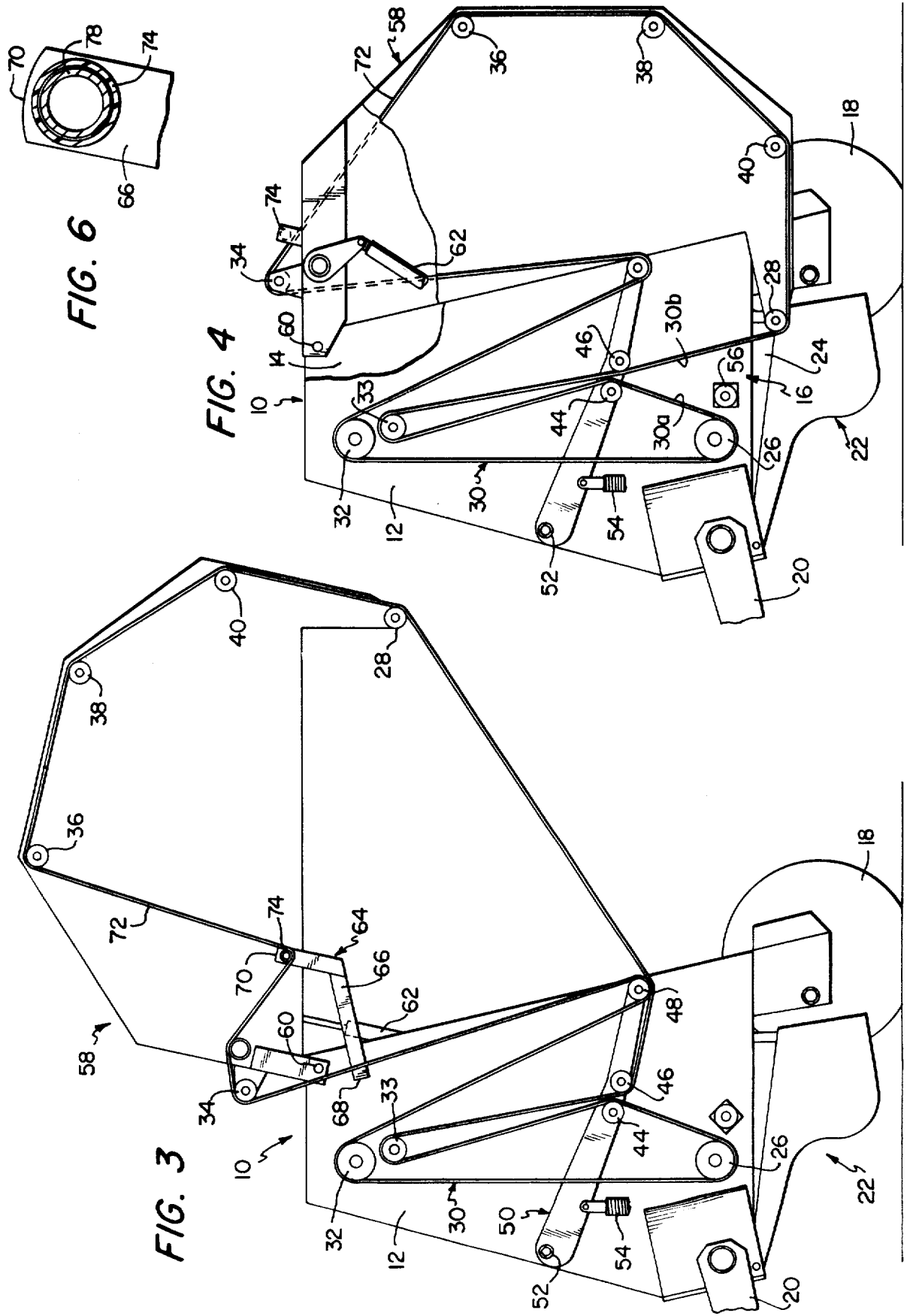

ROTARY BALER HAVING BALE-EJECTING APPARATUS

TECHNICAL FIELD

This invention relates to the harvesting arts and, more particularly, to a rotary baler provided with means for assisting in the positive ejection of a bale from the baling chamber of the machine at the completion of the forming cycle thereof.

BACKGROUND ART AND SUMMARY OF THE PRESENT INVENTION

It has been found that under certain conditions rotary bales have a tendency to become lodged in the baling chamber of a rotary machine, either due to axial pressure exerted by the opposite ends of the bale against the sidewalls of the machine or engagement with associated other structures of the baler. Accordingly, one important object of the present invention is to provide means for adding a positive ejecting force against the bale as the baler is opened during the discharging cycle so as to augment the force of gravity in ejecting a finished bale from the baler.

In carrying out the foregoing, the baler is provided with a stationary belt-tightening device located in a position to normally remain out of engagement with the belts during operation of the baler to form a bale. However, the device is so located that when the tailgate of the baler is opened for bale discharge, a span of the belts is carried by the tailgate into engagement with the device such that the belts are progressively deflected in a transverse direction to effectively tighten same and to cause those portions still in engagement with the bale to exert ejecting force against the latter to assist gravity in discharging the bale from the machine. Preferably, the belt-engaging member of the device is freely rotatable about its longitudinal axis.

BRIEF DESCRIPTION OF THE DRAWINGS

FIG. 1 is a fragmentary, side elevational view of a rotary baler employing the bale-ejecting apparatus of the present invention, the near sidewall of said baler being removed to show details of construction, and the baler being shown at the completion of a bale-forming cycle with a full-sized bale therein;

FIG. 2 is a view of the baler similar to FIG. 1 with the tailgate partially open, and the bale partially ejected;

FIG. 3 is a view of the baler similar to FIGS. 1 and 2 showing the tailgate fully raised;

FIG. 4 is a view of the baler similar to FIGS. 1, 2, and 3 but with the tailgate returned to its closed position and the machine ready to begin the next baling cycle;

FIG. 5 is an enlarged, fragmentary, cross-sectional view of the baler adjacent the top thereof showing details of construction of the belt-tightening device of the present invention, such view being taken substantially along line 5—5 of FIG. 1; and FIG. 6 is an enlarged, fragmentary, cross-sectional view of the tightener device taken substantially along line 6—6 of FIG. 5.

DETAILED DESCRIPTION

The baler 10 includes two opposite lateral sides 12 and 14 (side 14 is shown in FIGS. 4 and 5) which serve to define opposite lateral extremes of an internal baling chamber 16 of the baler 10. The sides 12 and 14 are supported in a suitable manner on a mobile chassis that includes ground-engaging wheels 18 (only one being shown), such chassis in turn having a fore-and-aft extending tongue 20 that may be hitched to a forwardly disposed towing vehicle (not shown) for drawing the baler 10 across a field having windrowed crop material lying thereon.

The baler 10 further includes a pickup 22 adjacent the lower front extremity of the baling chamber 16 for use in lifting the windrowed material off the ground as the baler 10 is advanced and for introducing such material up into the chamber 16 via a bottom entrance 24 located between a pair of transverse rollers 26 and 28 spanning the chamber 16 and journaled at opposite ends by the sides 12 and 14. The pickup 22 is only schematically shown herein, but its construction and mode of operation will be readily apparent to those skilled in the art.

The rollers 26 and 28 are but two of a substantial number of transverse rollers in the baler 10 which are used to control and guide an endless, flexible web 30 utilized to apply compacting pressure to a bale during formation thereof and to further provide a rolling or spinning action to the bale so that the latter can coil itself up into a bale of progressively increasing diameter as new material is continuously introduced to the chamber 16 via the entrance 24. In addition to the roller 26 and 28, then, the other rollers journaled by the sides 12 and 14 are arranged in a generally circumferential pattern viewing FIG. 1 and are designated by the numerals 32, 33, 34, 36, 38, and 40 respectively. In addition to these rollers, the web 30 is also controlled by three rollers 44, 46 and 48 carried by a slack-takeup arm assembly 50 pivoted to the sides 12 and 14 adjacent the front of the baler 10 via a pivot 52 for up-and-down swinging movement between the two extreme positions illustrated in FIGS. 1 and 4. A suitable spring 54 yieldably biases the arm assembly 50 downwardly toward its FIG. 4 position, and the web 30 is entrained about the rollers 26,28 and 32–48 in such a manner that additional slack is paid out to web 30 by the arm assembly 50 as the latter is raised toward its FIG. 1 position.

As illustrated in FIG. 4, the web 30 initially presents a pair of generally vertically extending stretches 30a and 30b on opposite fore-and-aft sides of the initially small chamber 16, said stretches 30a and 30b being driven in opposite, generally vertical direction via drive mechanism not shown so as to impart a desired tumbling action to material introduced into the chamber 16, said tumbling action subsequently evolving into a spinning or rolling action of the resultant bale. An auxiliary transverse roller 56 may be positioned within the entrance 24 rearwardly adjacent the roller 26 for use in keeping the periphery of the growing bale off the roller 26, said roller 56 also being driven, if desired, so as to assist in driving the bale during its spinning action.

The sides 12 and 14 are each divided into a front and a rear section, the two rear sections cooperating to form a tailgate 58 which is hinged to the remaining portion of the baler 10 via a transverse pivot 60 adjacent the top central portion of the baler 10. Rollers 34, 36, 38, 40 and 28 are carried by the tailgate 58 so as to move with the latter when it is swung between its closed position illustrated in FIGS. 1 and 4 and its fully opened position illustrated in FIG. 3. Thus, a portion of the web 30 is likewise carried by the tailgate 58 and swings with the latter during its movement between such positions. A hydraulic piston-and-cylinder unit 62 on each side 12,14 of the baler 10 may be used to power the tailgate 58 between its alternate positions.

A web-tightener device broadly denoted by the numeral 64 projects rearwardly from the front portion of the baler 10 into the area occupied by the tailgate 58 but is not movable with the latter. Device 64 is of generally U-shaped construction, including a pair of generally L-shaped legs 66 attached at their forward ends 68 to the interior surfaces of the sides 12 and 14 of the front portion of the baler 10. The legs 66 extend rearwardly from such points of attachment across the interface between the tailgate 58 and the front portion of the baler 10 and are upturned so as to present their rear ends 70 at a location slightly above a span 72 of the web 30 between the rollers 34 and 36 when the tailgate 58 is in its closed position of FIGS. 1 and 4. The bight of the device 64 is defined by a transverse, tubular member 74 spanning the legs 66 at their rear ends 70 and disposed in slightly outwardly and upwardly spaced relationship to the span 72 of web 30 when the tailgate 58 is closed. Member 74 traverses the entire width of the span 72 as shown in FIG. 5, and as also shown in that figure, the web 30 may consist of a series of laterally spaced apart, endless belts 76 across the width of the bale chamber 16. Member 74 is rotatably carried by a fixed shaft 78 bridging the two rear ends 70 of the legs 66.

OPERATION

When the baler 10 is empty and the tailgate 58 is closed, the web 30 assumes the configuration illustrated in FIG. 4. As the baler 10 is advanced and crop material is fed up into the chamber 16, the latter grows in size as the arm assembly 50 swings upwardly against the downward bias of the spring 54 until a fully formed bale is produced having the configuration of the bale 80 in FIG. 1. Thereupon, the cylinders 62 may be extended to swing the tailgate 58 upwardly and rearwardly in the manner illustrated in FIG. 2 toward the fully open position of FIG. 3.

As the tailgate 58 is opened, the span 72 of web 30 is carried with the tailgate 58 into engagement with the transverse member 74 of tightener device 64 such that the latter deflects the span 72 transversely out of its normal, straight-line condition between the rollers 34 and 36. The further the tailgate 58 is raised, the greater the deflection of the span 72 by member 74 as may be seen by comparing FIGS. 2 and 3.

This deflection by member 74 causes a tightening of the web 30 along its areas of contact with the periphery of bale 80 such that the web 30 exerts a pushing or ejecting force against the bale 80 that would not be present if the web 30 were permitted to go slack during opening of the tailgate 58. Consequently, as illustrated in FIG. 2, the bale 80 is forcefully ejected downwardly and rearwardly out of the chamber 16 by the combined forces of gravity and the web 30 such that, by the time the tailgate 58 is fully raised to its FIG. 3 position, the bale 80 will have been dropped to the ground.

As a result of this arrangement, any tendency of the bale 80 to remain lodged in the chamber 16 due to frictional engagement with the sides 12 and 14 or otherwise is counteracted. The operator is thereby assured that each bale will be safely and fully ejected from the baler 10 at the completion of each formation thereof.

I claim:

1. In a rotary baler having a flexible web carried in part by a gate of the baler swingable to an open position for discharge of a finished bale from the baler, said web being disposed for driving engagement with the bale during formation thereof and continuing in contact with the bale until the latter is fully discharged, a bale ejecting improvement comprising:

a web-tightening device disposed in the path of travel of the web as the latter is carried by said gate during movement to said open position thereof, said device being disposed to deflect said web transversely thereof during said movement of the gate whereby to apply an ejecting force to the bale through said web, said web being disposed out of substantial deflecting engagement with said device when the gate is in a closed position thereof.

2. In a rotary baler as claimed in claim 1, wherein said device includes a member spanning said web and held against movement with the gate.

3. In a rotary baler as claimed in claim 1, wherein said device is of generally U-shaped configuration, having a pair of laterally spaced legs situated outboard of opposite lateral extremes of the web and held against movement with the gate, and an elongated bight member spanning said legs and the web.

4. In a rotary baler as claimed in claim 3, wherein said member is mounted for free rotation about the longitudinal axis thereof.

5. In a rotary bale as claimed in claim 1, wherein said web comprises a series of individual, laterally spaced apart belts.

* * * * *